(12) United States Patent
Alkalay et al.

(10) Patent No.: US 11,003,629 B2
(45) Date of Patent: May 11, 2021

(54) DUAL LAYER DEDUPLICATION FOR APPLICATION SPECIFIC FILE TYPES IN AN INFORMATION PROCESSING SYSTEM

(71) Applicant: EMC IP Holding Company LLC, Hopkinton, MA (US)

(72) Inventors: Amitai Alkalay, Kadima (IL); Zvi Schneider, Tel Aviv (IL); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 234 days.

(21) Appl. No.: 16/176,820

(22) Filed: Oct. 31, 2018

(65) Prior Publication Data
US 2020/0134051 A1 Apr. 30, 2020

(51) Int. Cl.
*G06F 17/30* (2006.01)
*G06F 16/174* (2019.01)
*G06F 3/06* (2006.01)

(52) U.S. Cl.
CPC ........ *G06F 16/1752* (2019.01); *G06F 3/0608* (2013.01); *G06F 3/0641* (2013.01); *G06F 3/0683* (2013.01)

(58) Field of Classification Search
CPC ........ G06F 16/13; G06F 16/24; G06F 16/156; G06F 3/0641; G06F 40/14
See application file for complete search history.

(56) References Cited

U.S. PATENT DOCUMENTS

| | | |
|---|---|---|
| 7,444,464 B2 | 10/2008 | Urmston et al. |
| 8,095,726 B1 | 1/2012 | O'Connell et al. |
| 8,214,612 B1 | 7/2012 | Natanzon |
| 9,104,326 B2 | 8/2015 | Frank et al. |
| 9,208,162 B1 | 12/2015 | Hallak et al. |
| 9,286,003 B1 | 3/2016 | Hallak et al. |
| 9,552,258 B2 | 1/2017 | Hallak et al. |
| 9,606,870 B1 | 3/2017 | Meiri et al. |

(Continued)

FOREIGN PATENT DOCUMENTS

WO    2016111954 A1    7/2016

OTHER PUBLICATIONS

EMC Corporation, "Introduction to the EMC XtremIO Storage Array (Ver. 4.0): A Detailed Review," White Paper, Apr. 2015, 65 pages.
EMC Corporation, "Unstoppable Data Reduction: Always-on, In-Line, Zero-Penalty, Enterprise-Class, Free," https://store.emc.com/xtremio, Jul. 2014, 2 pages.

(Continued)

*Primary Examiner* — Hung D Le
(74) *Attorney, Agent, or Firm* — Ryan, Mason & Lewis, LLP (57) ABSTRACT

An apparatus in one embodiment comprises at least one processing device comprising a processor coupled to a memory. The at least one processing device is configured to obtain a file and to determine a type of the file. A structure of the file may be determined based at least in part on the determined type of the file and at least one location in the file may be identified based at least in part on the determined structure. The file may be divided at the identified at least one location into a plurality of chunks and the plurality of chunks may be provided to a block deduplication module of a storage system where the block deduplication module is configured to perform a deduplication process based at least in part on the plurality of chunks.

20 Claims, 7 Drawing Sheets

(56) References Cited

U.S. PATENT DOCUMENTS

| | | | |
|---|---|---|---|
| 9,716,754 | B2 | 7/2017 | Swift |
| 2008/0279462 | A1 | 11/2008 | Celi, Jr. |
| 2009/0132955 | A1 | 5/2009 | Garg et al. |
| 2010/0179941 | A1 | 7/2010 | Agrawal et al. |
| 2012/0084268 | A1* | 4/2012 | Vijayan .............. G06F 3/0608 707/692 |
| 2013/0073528 | A1* | 3/2013 | Aronovich .......... G06F 16/1752 707/692 |
| 2013/0238570 | A1* | 9/2013 | Rao .................... G06F 3/067 707/692 |
| 2013/0325824 | A1 | 12/2013 | Shoens |
| 2014/0095439 | A1* | 4/2014 | Ram .................... G06F 3/067 707/640 |
| 2014/0181016 | A1 | 6/2014 | Whitehead et al. |
| 2014/0279952 | A1* | 9/2014 | Akirav ............... G06F 16/1748 707/692 |
| 2014/0344229 | A1* | 11/2014 | Lillibridge .......... G06F 16/1752 707/692 |
| 2015/0019508 | A1* | 1/2015 | Aronovich .......... G06F 16/1752 707/692 |
| 2015/0378638 | A1* | 12/2015 | Baldwin .............. G06F 3/064 707/692 |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2016/0266653 | A1* | 9/2016 | Liu ..................... G06F 3/0304 |
| 2016/0292048 | A1* | 10/2016 | Dolan ................. G06F 3/0608 |
| 2017/0192857 | A1 | 7/2017 | Meiri et al. |

OTHER PUBLICATIONS

EMC Corporation, "Introduction to XtremIO Virtual Copies," White Paper, Mar. 2016, 39 pages.
EMC Corporation, "XtremIO Data Production (XDP): Flash-Specific Data Protection, Provided by XtremIO (Ver. 4.0)," White Paper, Apr. 2015, 25 pages.
Dell EMC, "XtremIO v6.0 Specifications," Specification Sheet, 2017, 4 pages.
Dell EMC, "Dell EMC XtremIO X2: Next-Generation All-Flash Array," Data Sheet, 2017, 5 pages.
EMC Corporation, "High Availability, Data Protection and Data Integrity in the XtremIO Architecture," White Paper, Apr. 2015, 28 pages.
Y. Zhang et al., "End-to-End Integrity for File Systems: A ZFS Case Study," Proceedings of the 8th USENIX Conference on File and Storage Technologies (FAST), Feb. 23-26, 2010, 14 pages.
Dell EMC, "Introduction to Dell EMC XtremIO X2 Storage Array—A Detailed Review," Dell EMC White Paper, Aug. 2017, 46 pages.
N. Tolia et al., "Opportunistic Use of Content Addressable Storage for Distributed File Systems," Proceedings of the USENIX Annual Technical Conference, Jun. 9-14, 2003, 14 pages.
EMC Corporation, "EMC Recoverpoint Replication of XtremIO: Understanding the Essentials of RecoverPoint Snap-Based Replication for XtremIO," EMC White Paper, Aug. 2015, 31 pages.
Dell EMC, "Introduction to Dell EMC XtremIO X2 Storage Array—A Detailed Review," Dell EMC White Paper, Apr. 2018, 52 pages.
Dell EMC, "Introduction to XtremIO Metadata-Aware Replication," Dell EMC White Paper, Apr. 2018, 18 pages.

* cited by examiner

DUAL LAYER DEDUPLICATION FOR APPLICATION SPECIFIC FILE TYPES IN AN INFORMATION PROCESSING SYSTEM

FIELD

The field relates generally to information processing systems, and more particularly to storage in information processing systems.

BACKGROUND

In many information processing systems, it is desirable to implement deduplication functionality in order to ensure that the same data is not repeatedly stored in a duplicative manner that consumes excessive storage capacity. However, conventional approaches to deduplication can be problematic. For example, in block based inline deduplication storage systems, the use of block aligned deduplication may be less effective than byte aligned deduplication. For example, in such block-based storage systems input-output requests typically arrive in blocks and are deduplicated at the block level of granularity. This may cause data that would have been otherwise deduplicated on a byte level granularity to be retained in the storage system at the block level of granularity, for example, due to a minor shift or other changes to a portion of the data in the block. These and other related deduplication inefficiencies can significantly undermine system performance and system storage capacity.

SUMMARY

Illustrative embodiments provide techniques for dual layer deduplication for application specific file types in an information processing system.

In one embodiment, at least one processing device comprises a processor coupled to a memory. The at least one processing device is configured to obtain a file and to determine a type of the file. A structure of the file may be determined based at least in part on the determined type of the file and at least one location in the file may be identified based at least in part on the determined structure. The file may be divided at the identified at least one location into a plurality of chunks and the plurality of chunks may be provided to a block deduplication module of a storage system where the block deduplication module is configured to perform a deduplication process based at least in part on the plurality of chunks.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1A:
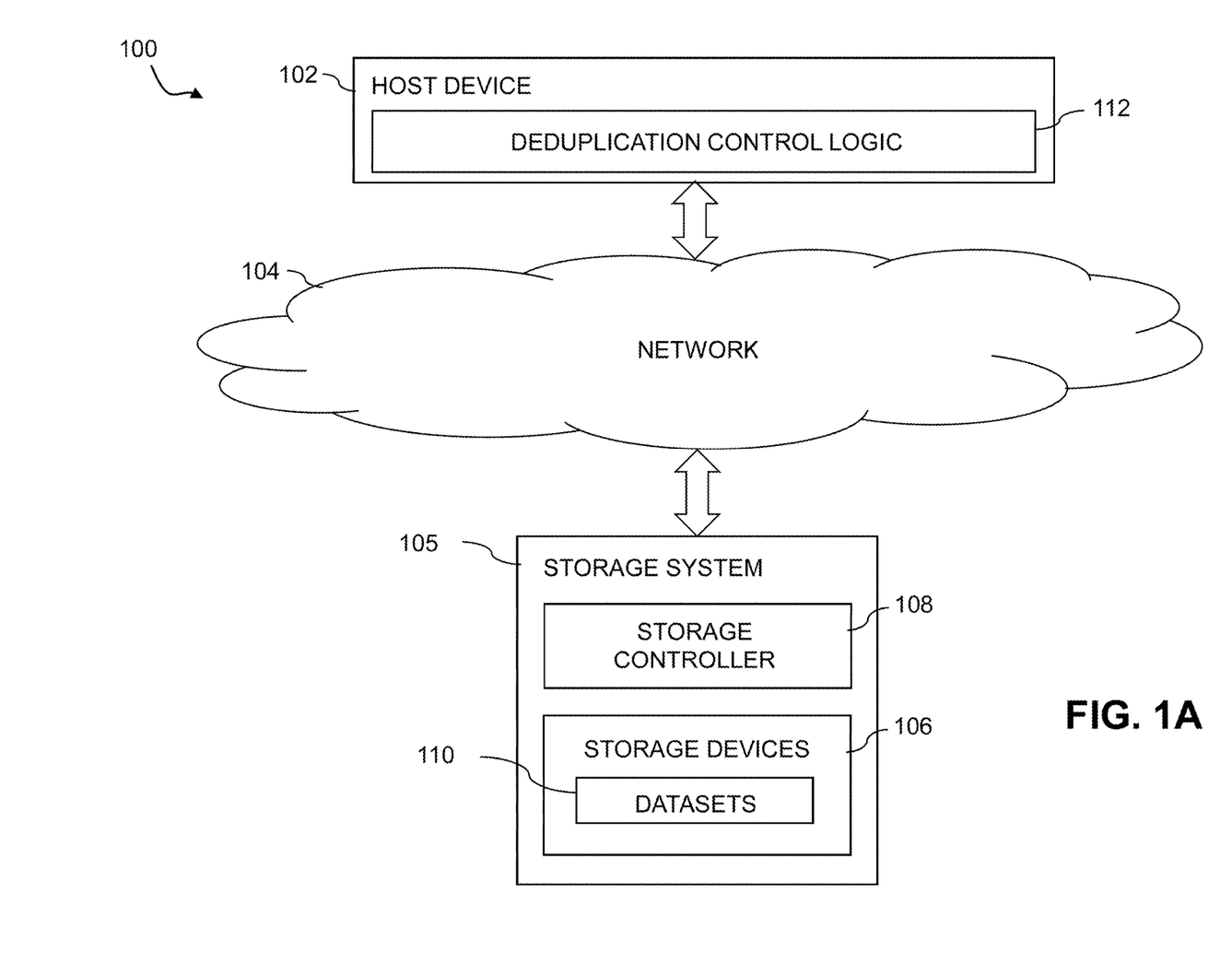
FIG. 1A is a block diagram of an information processing system comprising a host device configured with functionality for dual layer deduplication for application specific file types in an illustrative embodiment.

FIG. 1A shows an information processing system 100 configured in accordance with an illustrative embodiment. The information processing system 100 comprises a host device 102, which may comprise one of a plurality of host devices of a computer system. The host device 102 communicates over a network 104 with a storage system 105, which may comprise one of a plurality of storage systems of the information processing system 100. The host device 102 and storage system 105 may be part of an enterprise computing and storage system, a cloud-based system or another type of system.

The host device 102 and storage system 105 illustratively comprise respective processing devices of one or more processing platforms. For example, the host device 102 and the storage system 105 can each comprise one or more processing devices each having a processor and a memory, possibly implementing virtual machines and/or containers, although numerous other configurations are possible.

The host device 102 and the storage system 105 can additionally or alternatively be part of cloud infrastructure such as an Amazon Web Services (AWS) system. Other examples of cloud-based systems that can be used to provide one or more of host device 102 and storage system 105 include Google Cloud Platform (GCP) and Microsoft Azure.

The host device 102 is configured to write data to and read data from the storage system 105. The host device 102 and the storage system 105 may be implemented on a common processing platform, or on separate processing platforms. A wide variety of other types of host devices can be used in other embodiments.

The host device 102 in some embodiments illustratively provides compute services such as execution of one or more applications on behalf of each of one or more users associated with the host device 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 105 is accessible to the host device over the network 104. The storage system 105 comprises a plurality of storage devices 106 and an associated storage controller 108. The storage devices 106 store datasets 110.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the storage system 105 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement storage system 105 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage system 105 in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The host device 102 in the FIG. 1A embodiment includes deduplication control logic 112. The deduplication control logic is configured to control performance of a dual layer deduplication process for application specific file types such as that illustrated in the flow diagram of FIG. 3. The host device 102 should also be understood to include additional modules and other components typically found in conventional implementations of computers, servers or other host devices, although such additional modules and other components are omitted from the figure for clarity and simplicity of illustration.

The host device 102 via its deduplication control logic 112 is configured to perform dual layer deduplication for application specific file types by dividing files into chunks based on a structure of each file as defined by their respective file types. For example, deduplication control logic 112 is configured to determine a type of a file, determine a structure of the file based on the determined file type, identify at least one location in the file based on the determined structure, and divide the file at the identified at least one location into a plurality of chunks. This process may be considered a first layer of the deduplication process. The deduplication control logic 112 may provide the chunks to a storage system 105 for performing a further deduplication process which may be considered a second layer of the deduplication process. The further deduplication process in some embodiments may be a deduplication process that is typically performed by a storage system.

Information processing systems typically employ a filesystem over the storage system and storage devices. A filesystem often includes a plurality of files which are mapped to a range of blocks on the underlying storage devices. In many cases, parts or portions of multiple files in the filesystem may include identical data. For example, a customer may generate a set of video files, e.g., for an advertisement, movie, television show, or other purpose. The video files may all be identical with the exception that each video has a different set of embedded subtitles. For example, the embedded subtitles may be in different languages where each video is targeted at a country speaking a different language. Differences in the subtitles between the otherwise identical video files, however, may cause drift in the block alignment of the data in the video files. This difference in block alignment may cause the storage system to determine that the video files contain little to no identical data at the block level of granularity and therefore little or no deduplication of the video files may be performed which results in redundant storage of the video file on the storage devices. Such a case may cause excessive waste of both processing resources and storage space in the storage system.

One solution to such a problem may be to employ a byte aligned deduplication system to manage such an alignment problem which may achieve improved deduplication ratios. However, in a block-based storage system where input-output requests arrive in blocks, byte aligned deduplication may be difficult to implement due to the difficulty in dividing the data correctly into chunks for performing deduplication processing on a byte-by-byte level.

Some applications may compress multiple files into a single file. For example, a file having an open Extensible Markup Language (XML) format, which is a zip file, may contain multiple sub-files. Different versions of the same document often include a number of common sub-files inside the zip file and may be compressed in the same way. However, the compressed format is not typically block aligned. Thus, different versions of the same file, which can be very large, may not be deduplicated at all when stored in a block level deduplication storage system due to such a misalignment even when one or more sub-files or portions within the file are identical.

The disclosed deduplication control logic 112 provides for dual layer deduplication of files having application specific file types. The deduplication control logic 112 may, for example, be implemented by a filesystem driver in a filesystem executing on the host device 102 or on storage system 105. For example, deduplication control logic 112 may be implemented in an information processing system 100 which utilizes a block level deduplication process.

The deduplication control logic 112 may generate a new representation of a file based on the file type and file structure which may be used to improve block level deduplication as described in more detail herein. The deduplication control logic 112, as described herein, allows the backend block deduplication process performed by the storage system 105 to achieve significantly higher deduplication ratios with little to no effect on performance of the storage system 105.

In illustrative embodiments, a file in the filesystem may include file data, e.g., video data, subtitle data, text data, audio data, or any other data that may be contained in a file, and a metadata file including information which describes a structure of the file.

Deduplication control logic 112 is configured to divide the file into multiple pieces, also called chunks, instead of keeping the file in its original form. In some embodiments, for example, deduplication control logic 112 may be configured to divide the file into chunks that are bit aligned.

Once divided, deduplication control logic 112 pads out each chunk until the size of the chunk is a multiple of the block size of the deduplicated block storage system, e.g., 16 KB or any other block size. For example, a chunk may be padded out by adding trailing zeros until the end of the block.

Deduplication control logic 112 may also be application aware when dividing the file into chunks where, for example, deduplication control logic 112 may include one or more chunking algorithms for determining where to divide a file into chunks that may be different for each application file format, e.g., file type and structure. As an example, for a file that has a zip file format including multiple sub-files such as, e.g., a docx or pptx, the chunking algorithm may include instructions to divide the file in locations where each sub-file of the zip file starts or finishes, e.g., based on structural knowledge about how zip files are formatted. In some cases, for example, if a sub-file is sufficiently small, e.g. much smaller than the block size of the storage system 105, such that more than one sub-file may be stored together in a single block, the chunking algorithm may include more than one sub-file in a chunk.

By dividing the file into chunks and padding out the chunks with trailing zeroes in this manner, deduplication control logic 112 may provide a consistent and repeatable way of manipulating files in the filesystem that results in more easily deduplicated data. For example, even if the data within a file is shifted, e.g., there are additional sub-files, or one or more sub-files are different, by dividing the file into chunks based on the structure of the file, as defined by the file type, identical sub-files between two different files may be identified and processed for deduplication.

Deduplication control logic 112 may in some illustrative embodiments store or add information indicating the list of locations where a file was divided into chunks into the metadata file of that file. In some embodiments, the metadata file need not include the information indicating the list of locations where the file was divided into chunks. For example, since the chunking algorithm is deterministic based on the file type and structure, deduplication control logic 112 may verify whether or not a location in the file is a location for dividing the file into chunks without first inspecting metadata associated with the file. However, the information in the metadata indicating the list of locations where a file was divided into chunks may in some embodiments be used by the storage system 105 to perform random accesses of the file or portions of the file, e.g., sub-files.

Deduplication control logic 112 may in some illustrative embodiments hide the metadata file from an application using deduplication control logic 112. For example, the metadata file may comprise additional information added to a file by deduplication control logic 112 for use by a filesystem driver that is not accessible or visible to the application. For example, if the deduplication control logic 112 chunked the file myfile.docx into a plurality of chunks based on file type, the application and user of the application will still see only the original file "myfile.docx". Deduplication control logic 112, however, performed the following actions on the original "myfile.docx":

1. Created a chunked file based on myfile.docx (e.g., with trailing zeros after each chunk to pad the block out to fill a 16 k block.

2. Created an additional metadata file that describes the location of each chunk, chunk size without trailing zeros, or other similar intermediate data.

Both the chunked file and the additional metadata file may be stored in internal data structures of the filesystem driver executing the deduplication control logic 112 and hidden from a calling application which may in some embodiments only see the original file in the filesystem. For example, when the application wants to read the file at offset 9836, the filesystem driver may access the metadata file, find the relevant chunk, and read the chunk from the chunked file instead of just taking the base offset from the filesystem and adding 9836.

Figure 1B:
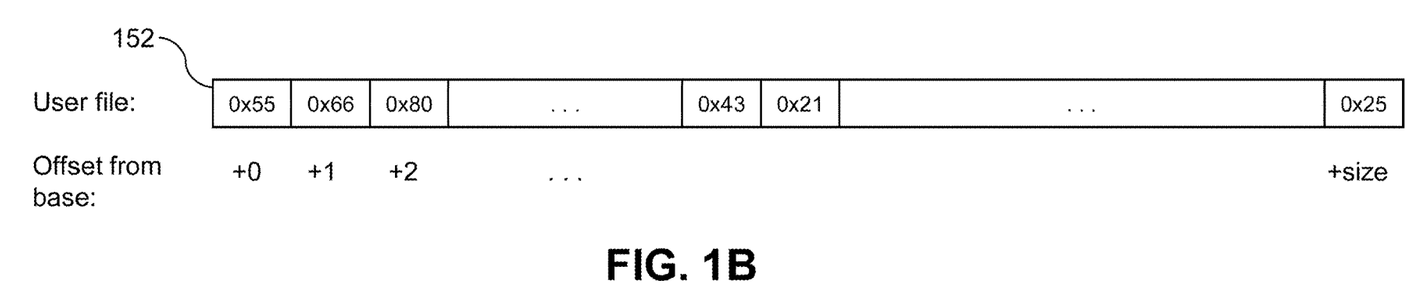
FIG. 1B is a block diagraph of a user file in an illustrative embodiment.
Figure 1C:
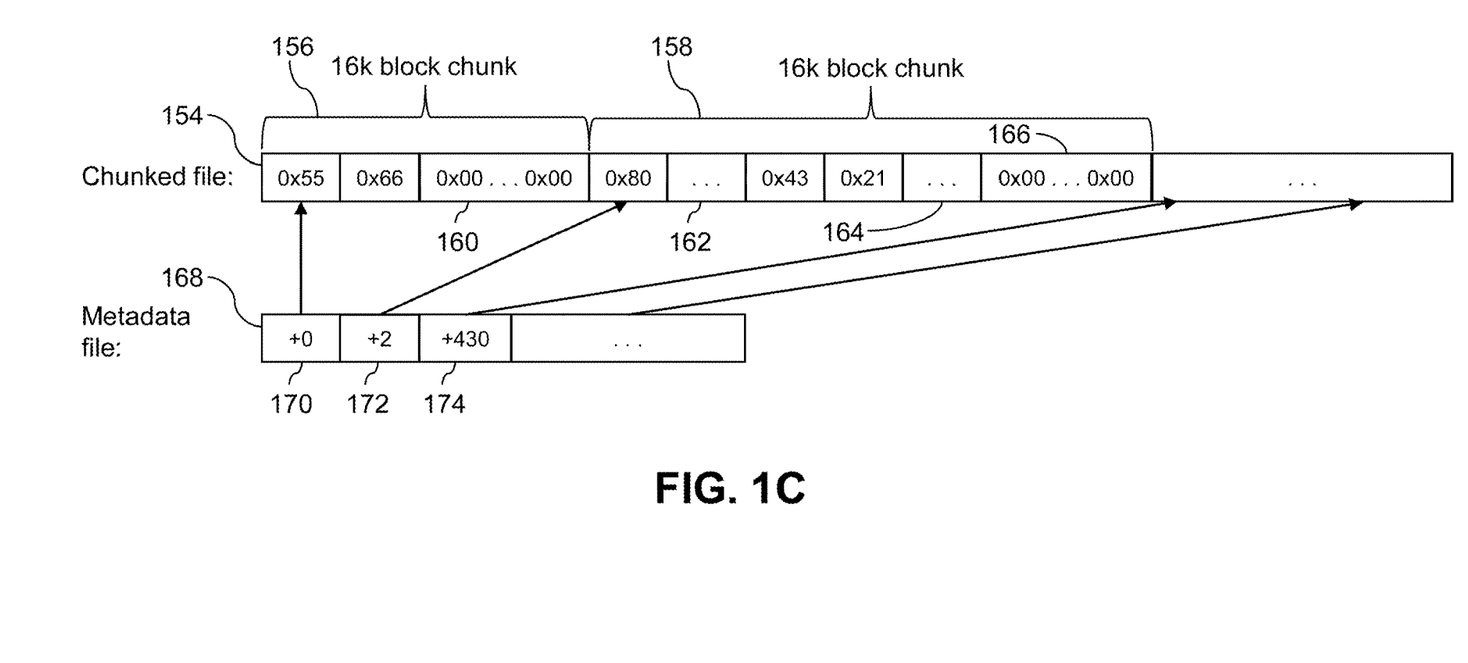
FIG. 1C is a block diagraph of a chunked file in an illustrative embodiment.

With reference to FIGS. 1B and 1C, an example user file 152 and the corresponding chunked file 154 are illustrated. As can be seen from FIG. 1B, each portion of data is stored in the user file 152 at a particular offset from the base address, e.g., base+0 stores data 0x55, base+1 stores data 0x66, etc. When the file is chunked by deduplication control logic 112, e.g., into 16 k blocks according to the file type, a chunked file 154 may be generated as shown, for example, in FIG. 1C. As an example, if the file type of the user file 152 is a zip file, data 0x55 and data 0x66 at offsets +1 and +2 may be associated with a first file within the zip file while data 0x80, 0x43, 0x21, and other data may be associated with a second file. Deduplication control logic 112 may identify the start, finish, or both of each file according to the file type of the user file, e.g., by determining that the user file is a zip file, and may generate the chunked file based on this information. For example, deduplication control logic 112 may generate a first chunk 156 including the data associated with the first file, e.g., data 0x55 and 0x66, and a second chunk 158 including the data associated with the second file, e.g., data 0x80, data 0x43, data 0x21, and other data. For example, in chunked file 154, data 0x55 and data 0x66 associated with the first file, and a padding of trailing zeroes 160 may be included in the first chunk 156, e.g., a 16 kb block according to a block size of the storage system. Likewise, in chunked file 154, data 0x80, intervening data 162, data 0x43, data 0x21, and some other portion of data 164 associated with the second file, and a padding of trailing zeroes 166 may be included in the second chunk 158, e.g., another 16 kb block according to the block size of the storage system.

With continued reference to FIG. 1C, a metadata file 168 may be generated or updated by deduplication control logic 112 based on the chunked file 154. For example, metadata file 168 may include information indicating the offset values into the original user file 152 for the beginning of each chunk. For example, as illustrated in FIG. 1C, metadata file 168 includes an offset value 170 of +0 for the beginning of the first chunk 156 (i.e., data 0x55 at offset base+0), an offset value 172 of +2 for the beginning of the second chunk 158 (i.e., data 0x80 at offset base+2), an offset value 174 of +430 for a third chunk (i.e., the offset of the first item of data included in a third chunk), and so on for each chunk of data included in the chunked file.

In some embodiments, the user file itself may not be stored internally by the filesystem driver. Instead, for example, the chunked file and corresponding metadata may be stored and used to service the application when data at a particular offset into the user file is requested, for example, based on the structures described above with reference to FIGS. 1B and 1C.

In some embodiments, the metadata file 168 may allow the filesystem driver to service random accesses to offset locations in the user file, e.g., by obtaining the corresponding chunk.

By executing deduplication control logic 112, the chunks provided to the storage system will be aligned relative to other chunks of data in the storage system 105 which provides for improved deduplication of identical data by the storage controller 108 during a deduplication process. The effect of adding trailing zeros to the chunks on the available storage space in the storage system 105 will also be minimized as compression algorithms such as, e.g., run-length encoding and Lempel-Ziv compression, may be used to significantly reduce the space used by the relevant blocks due to trailing zeroes.

While discussed with respect to a zip file format in the case of docx and pptx type files, chunking algorithms for any other file format such as, e.g., MP4, jpg, etc., may also be employed to consistently and repeatably divide files of those formats into chunks for use in the further deduplication process of the storage system 105.

The host device 102 and storage system 105 in the FIG. 1A embodiment are assumed to be implemented using at least one processing platform each comprising one or more processing devices each having a processor coupled to a memory. Such processing devices can illustratively include particular arrangements of compute, storage and network resources.

The host device 102 and the storage system 105 may be implemented on respective distinct processing platforms, although numerous other arrangements are possible. For example, in some embodiments at least portions of the host device 102 and the storage system 105 are implemented on the same processing platform. The storage system 105 can therefore be implemented at least in part within at least one processing platform that implements at least a portion of the host device 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host device 102 and storage system 105 to reside in different data centers. Numerous other distributed implementations of one or both of the host device 102 and the storage system 105 are possible. Accordingly, the storage system 105 can also be implemented in a distributed manner across multiple data centers.

Additional examples of processing platforms utilized to implement host devices and/or storage systems in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as host device 102, network 104, storage system 105, storage devices 106, storage controllers 108 and datasets 110 can be used in other embodiments.

It should be understood that the particular sets of modules and other components implemented in the system 100 as illustrated in FIG. 1A are presented by way of example only. In other embodiments, only subsets of these components, or additional or alternative sets of components, may be used, and such components may exhibit alternative functionality and configurations. Additional examples of systems implementing dual layer deduplication functionality will be described below.

Figure 2:
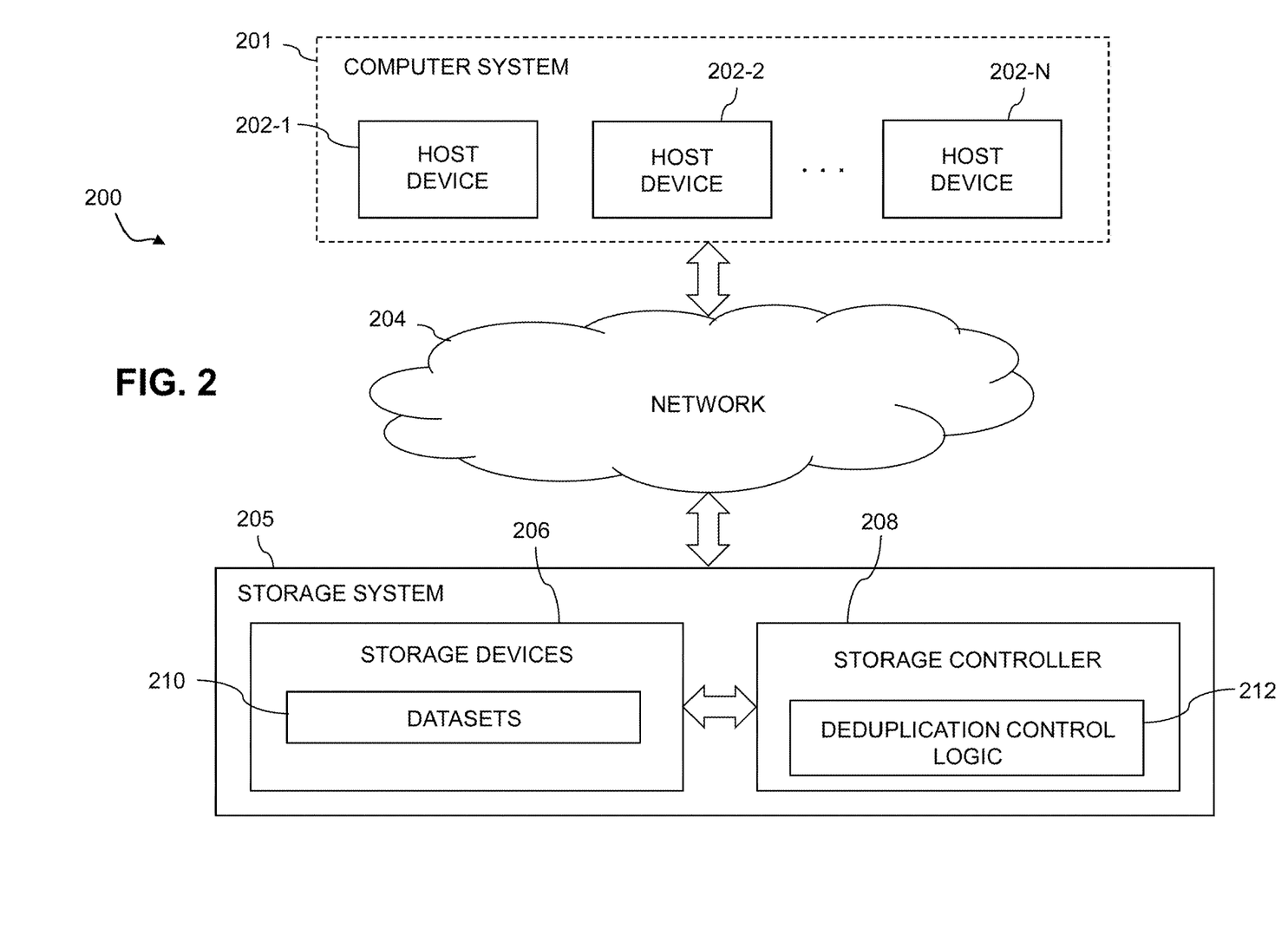
FIG. 2 is a block diagram of an information processing system comprising a storage system configured with functionality for dual layer deduplication for application specific file types in an illustrative embodiment.

FIG. 2 shows an information processing system 200 configured in accordance with another illustrative embodiment. The information processing system 200 comprises a computer system 201 that includes host devices 202-1, 202-2, . . . 202-N. The host devices 202 communicate over a network 204 with a storage system 205. The computer system 201 is assumed to comprise an enterprise computer system, cloud-based computer system or other arrangement of multiple compute nodes associated with respective users. The host devices 202 of the computer system 201 in some embodiments illustratively provide compute services such as execution of one or more applications on behalf of each of one or more users associated with respective ones of the host devices 202.

Similar to the storage system 105 of system 100, the storage system 205 comprises storage devices 206, storage controller 208 and datasets 210. However, in this embodiment, the functionality for dual layer deduplication is implemented in the storage system 205, rather than in one of the host devices 202. Accordingly, the storage controller 208 in this embodiment comprises the deduplication control logic 212, which is configured to operate in substantially the same manner as that described above for deduplication control logic 112 of the host device 102 in the system 100. For example, storage controller 208 may execute deduplication control logic 212 on files received as part of an IO request from one or more of host devices 202 prior to performing a further deduplication process.

In some embodiments, functionality for dual layer deduplication for application specific file types can be implemented partially in a host device and partially in a storage system. Accordingly, illustrative embodiments are not limited to arrangements in which all such functionality is implemented in a host device or a storage system, and therefore encompass various hybrid arrangements in which the functionality is distributed over one or more host devices and one or more storage systems, each comprising one or more processing devices.

The operation of the information processing systems 100 and 200 will now be described in further detail with reference to the flow diagram of the illustrative embodiment of FIG. 3. The process as shown includes steps 300 through 310, and is suitable for use in systems 100 and 200 but is more generally applicable to other types of information processing systems in which a host device or storage system is configured to perform dual layer deduplication. The steps are illustratively performed at least in part under the control of the deduplication control logic 112 in host device 102 of system 100 or in the deduplication control logic 212 in storage controller 208 of system 200.

In step 300, a file is obtained, e.g., by host device 102 or from one of the host devices 202 by storage controller 208.

In step 302, a file type of the obtained file may be determined by deduplication control logic 112 or 212. For example, deduplication control logic 112 or 212 may examine information associated with the file such as, e.g., a metadata file, to determine a file type of the file.

In step 304, deduplication control logic 112 or 212 determines a structure of the file based on the determined file type. For example, deduplication control logic 112 or 212 may match the determined file type to a chunking algorithm corresponding to that file type, e.g., stored in association with deduplication control logic 112 on host device or deduplication control logic 212 on storage system 205.

In step 306, deduplication control logic 112 or 212 identifies at least one location in the file based on the determined structure, e.g., using the relevant chunking algorithm for that file type.

In step 308, deduplication control logic 112 or 212 divides the file at the identified at least one location into a plurality of chunks. In some embodiments, this may complete the first layer of the deduplication process.

In step 310, deduplication control logic 112 or 212 provides the plurality of chunks to storage system 105 or 205 for performance of a block deduplication process based on the chunks, e.g., the second layer of the deduplication process.

Figure 3:
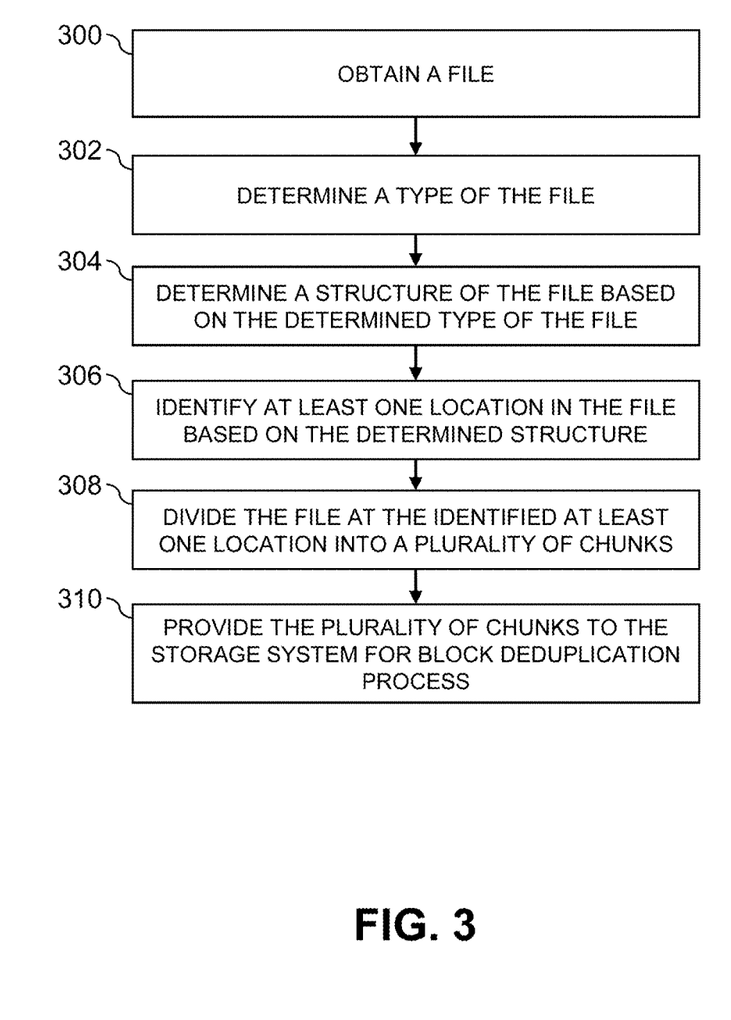
FIG. 3 is a flow diagram of a process for dual layer deduplication for application specific file types for datasets in an illustrative embodiment.

The particular processing operations and other system functionality described in conjunction with the flow diagram of FIG. 3 are presented by way of illustrative example only, and should not be construed as limiting the scope of the disclosure in any way. Alternative embodiments can use other types of processing operations for performing dual layer deduplication. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes for dual layer deduplication for application specific file types in different storage systems or portions thereof within a given information processing system. In addition, the process steps assigned to each of the first and second layers of the deduplication process may be varied in other embodiments or all of the process steps may be considered to be a single deduplication process.

Functionality such as that described in conjunction with the flow diagram of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a host device such as host device 102 or a storage controller such as storage controller 208 that is configured to control performance of one or more steps of the FIG. 3 process in its corresponding system 100 or 200 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The host device 102 of system 100 or the storage controller 208 of system 200, as well as other system components, may be implemented at least in part using processing devices of such processing platforms. For example, in a distributed implementation of the storage controller 208, respective distributed modules of such a storage controller can be implemented in respective containers running on respective ones of the processing devices of a processing platform.

In some embodiments, the storage system comprises an XtremIO™ storage array or other type of content addressable storage system suitably modified to incorporate dual layer deduplication for application specific file types techniques as disclosed herein.

An illustrative embodiment of such a content addressable storage system will now be described with reference to FIG. 4. In this embodiment, a content addressable storage system 405 comprises a plurality of storage devices 406 and an associated storage controller 408. The content addressable storage system 405 may be viewed as a particular implementation of the storage system 205, and accordingly is assumed to be coupled to host devices 202 of computer system 201 via network 204 within information processing system 200.

The storage controller 408 in the present embodiment is configured to implement dual layer deduplication functionality of the type previously described in conjunction with FIGS. 1A through 3.

The storage controller 408 includes distributed deduplication control logic 412, which is configured to operate in a manner similar to that described above for deduplication control logic 112 and 212.

Figure 4:
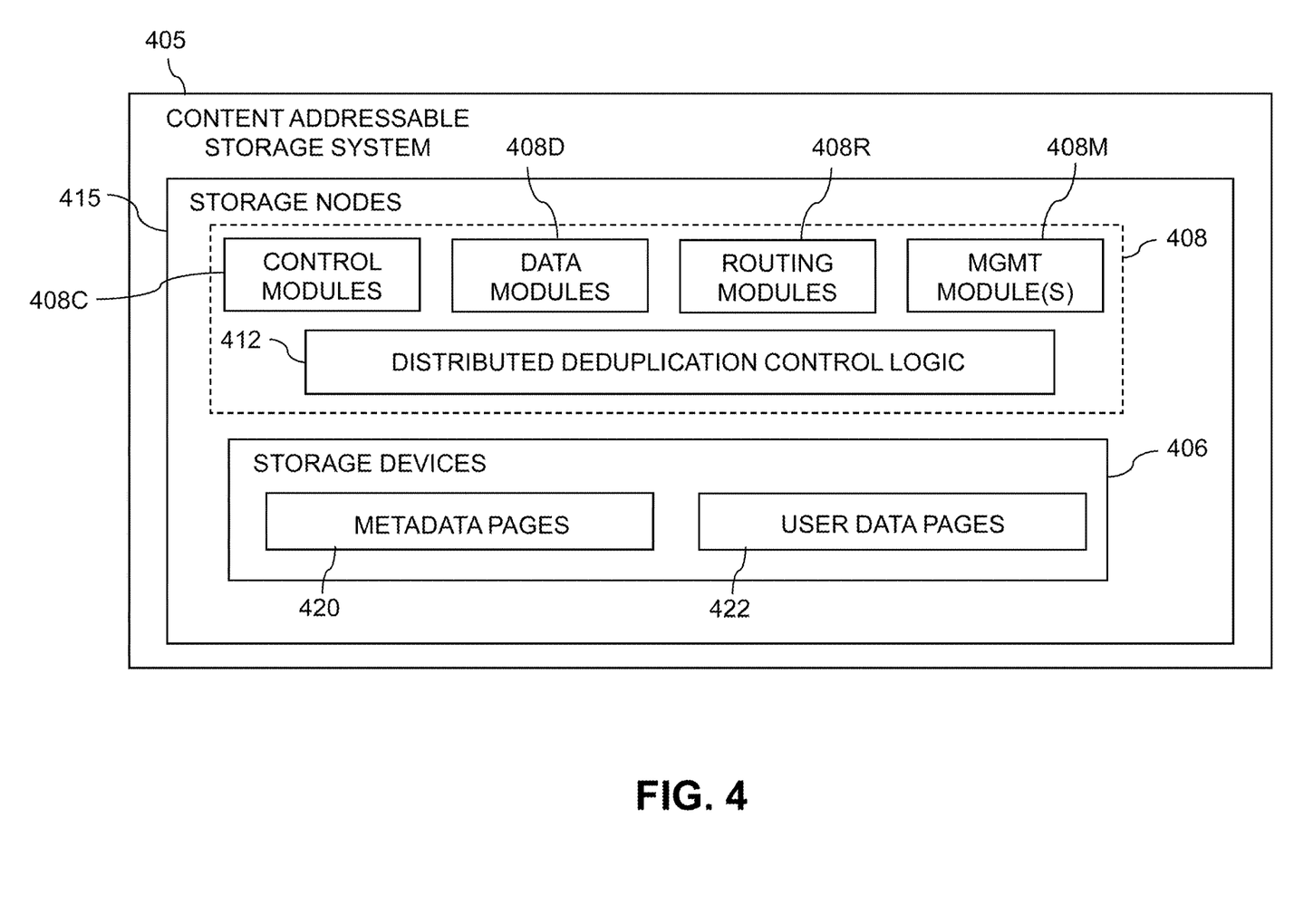
FIG. 4 shows a content addressable storage system having a distributed storage controller configured with functionality for dual layer deduplication for application specific file types in an illustrative embodiment.

The content addressable storage system 405 in the FIG. 4 embodiment is implemented as at least a portion of a clustered storage system and includes a plurality of storage nodes 415 each comprising a corresponding subset of the storage devices 406. Other clustered storage system arrangements comprising multiple storage nodes can be used in other embodiments. A given clustered storage system may include not only storage nodes 415 but also additional storage nodes coupled to network 204. Alternatively, such additional storage nodes may be part of another clustered storage system of the system 200. Each of the storage nodes 415 of the storage system 405 is assumed to be implemented using at least one processing device comprising a processor coupled to a memory.

The storage controller 408 of the content addressable storage system 405 is implemented in a distributed manner so as to comprise a plurality of distributed storage controller components implemented on respective ones of the storage nodes 415. The storage controller 408 is therefore an example of what is more generally referred to herein as a "distributed storage controller." In subsequent description herein, the storage controller 408 may be more particularly referred to as a distributed storage controller.

Each of the storage nodes 415 in this embodiment further comprises a set of processing modules configured to communicate over one or more networks with corresponding sets of processing modules on other ones of the storage nodes 415. The sets of processing modules of the storage nodes 415 collectively comprise at least a portion of the distributed storage controller 408 of the content addressable storage system 405.

The modules of the distributed storage controller 408 in the present embodiment more particularly comprise different sets of processing modules implemented on each of the storage nodes 415. The set of processing modules of each of the storage nodes 415 comprises at least a control module 408C, a data module 408D and a routing module 408R. The distributed storage controller 408 further comprises one or more management ("MGMT") modules 408M. For example, only a single one of the storage nodes 415 may include a management module 408M. It is also possible that management modules 408M may be implemented on each of at least a subset of the storage nodes 415.

Each of the storage nodes 415 of the storage system 405 therefore comprises a set of processing modules configured to communicate over one or more networks with corresponding sets of processing modules on other ones of the storage nodes. A given such set of processing modules implemented on a particular storage node illustratively includes at least one control module 408C, at least one data module 408D and at least one routing module 408R, and possibly a management module 408M. These sets of processing modules of the storage nodes collectively comprise at least a portion of the distributed storage controller 408.

Communication links may be established between the various processing modules of the distributed storage controller 408 using well-known communication protocols such as IP and Transmission Control Protocol (TCP). For example, respective sets of IP links used in data transfer and corresponding messaging could be associated with respective different ones of the routing modules 408R.

Although shown as a separate logic of the distributed storage controller 408, the distributed deduplication control logic 412 in the present embodiment is assumed to be distributed at least in part over at least a subset of the other modules 408C, 408D, 408R and 408M of the storage controller 408. Accordingly, at least portions of the dual layer deduplication for application specific file types functionality of the distributed deduplication control logic 412 may be implemented in one or more of the other modules of the storage controller 408. In other embodiments, the distributed deduplication control logic 412 may be implemented as stand-alone modules of the storage controller 408.

The storage devices 406 are configured to store metadata pages 420 and user data pages 422, and may also store additional information not explicitly shown such as checkpoints and write journals. The metadata pages 420 and the user data pages 422 are illustratively stored in respective designated metadata and user data areas of the storage devices 406. Accordingly, metadata pages 420 and user data pages 422 may be viewed as corresponding to respective designated metadata and user data areas of the storage devices 406.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 420 and the user data pages 422.

The user data pages 422 are part of a plurality of LUNs configured to store files, blocks, objects or other arrangements of data, each also generally referred to herein as a "data item," on behalf of users associated with host devices 202. Each such LUN may comprise particular ones of the above-noted pages of the user data area. The user data stored in the user data pages 422 can include any type of user data that may be utilized in the system 200. The term "user data" herein is therefore also intended to be broadly construed.

The content addressable storage system 405 in the embodiment of FIG. 4 is configured to generate hash metadata providing a mapping between content-based digests of respective ones of the user data pages 422 and corresponding physical locations of those pages in the user data area. Content-based digests generating using hash functions are also referred to herein as "hash digests." Such hash digests or other types of content-based digests are examples of what are more generally referred to herein as "content-based signatures" of the respective user data pages 422. The hash metadata generated by the content addressable storage system 405 is illustratively stored as metadata pages 420 in the metadata area. The generation and storage of the hash metadata is assumed to be performed under the control of the storage controller 408.

Each of the metadata pages 420 characterizes a plurality of the user data pages 422. For example, a given set of user data pages representing a portion of the user data pages 422 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include the above-noted SHA1 hash function, or other secure hashing algorithms known to those skilled in the art. The content-based signature is utilized to determine the location of the corresponding user data page within the user data area of the storage devices 406.

Each of the metadata pages 420 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 420 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 405 is illustratively distributed among the control modules 408C.

The dual layer deduplication for application specific file types functionality provided by distributed deduplication control logic 412 in this embodiment is assumed to be distributed across multiple distributed processing modules, including at least a subset of the processing modules 408C, 408D, 408R and 408M of the distributed storage controller 408.

For example, the management module 408M of the storage controller 408 may include deduplication control logic that engages corresponding deduplication control logic instances in all of the control modules 408C and routing modules 408R in order to implement a dual layer deduplication process.

In some embodiments, the content addressable storage system 405 comprises an XtremIO™ storage array suitably modified to incorporate techniques for dual layer deduplication for application specific file types as disclosed herein.

In arrangements of this type, the control modules 408C, data modules 408D and routing modules 408R of the distributed storage controller 408 illustratively comprise respective C-modules, D-modules and R-modules of the XtremIO™ storage array. The one or more management modules 408M of the distributed storage controller 408 in such arrangements illustratively comprise a system-wide management module ("SYM module") of the XtremIO™ storage array, although other types and arrangements of system-wide management modules can be used in other embodiments. Accordingly, dual layer deduplication functionality in some embodiments is implemented under the control of at least one system-wide management module of the distributed storage controller 408, utilizing the C-modules, D-modules and R-modules of the XtremIO™ storage array.

In the above-described XtremIO™ storage array example, each user data page has a fixed size such as 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 408C such that control of the slices within the storage controller 408 of the storage system 405 is substantially evenly distributed over the control modules 408C of the storage controller 408.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 405 each illustratively comprise one or more IO operations directing that at least one data item of the storage system 405 be written to in a particular manner. A given write request is illustratively received in the storage system 405 from a host device, illustratively one of the host devices 202. In some embodiments, a write request is received in the distributed storage controller 408 of the storage system 405, and directed from one processing module to another processing module of the distributed storage controller 408. For example, a received write request may be directed from a routing module 408R of the distributed storage controller 408 to a particular control module 408C of the distributed storage controller 408. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 415 communicate with one another over a high-speed internal network such as an InfiniBand network. The C-modules, D-modules and R-modules coordinate with one another to accomplish various IO processing tasks.

The write requests from the host devices identify particular data pages to be written in the storage system 405 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 405 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the storage system 405.

The first level of mapping using the A2H table associates logical addresses of respective data pages with respective content-based signatures of those data pages. This is also referred to logical layer mapping.

The second level of mapping using the HMD table associates respective ones of the content-based signatures with respective physical storage locations in one or more of the storage devices 406. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the storage system 405 correspond to respective physical blocks of a physical layer of the storage system 405. The user data pages of the logical layer are organized by LBA and have reference via respective content-based signatures to particular physical blocks of the physical layer.

Each of the physical blocks has an associated reference count that is maintained within the storage system 405. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 408C, 408D, 408R and 408M as shown in the FIG. 4 embodiment is presented by way of example only. Numerous alternative arrangements of processing modules of a distributed storage controller may be used to implement dual layer deduplication functionality in a clustered storage system in other embodiments.

Additional examples of content addressable storage functionality implemented in some embodiments by control modules 408C, data modules 408D, routing modules 408R and management module(s) 408M of distributed storage controller 408 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Illustrative embodiments of host devices or storage systems with dual layer deduplication for application specific file types as disclosed herein can provide a number of significant advantages relative to conventional arrangements.

For example, where the same or similar file includes data that has been shifted or adjusted in some manner, thereby resulting in no deduplication in a block deduplication-based storage system, the disclosed functionality for dual layer deduplication may consistently and repeatedly divide such files into chunks based on file type and structure such that identical portions of the data may still be deduplicated. This functionality provides significant benefits in both reducing wasted processing resources associated with storing duplicate data and reducing wasted storage space in the storage system.

Functionality for dual layer deduplication for application specific file types can be implemented in a host device, in a storage system, or partially in a host device and partially in a storage system.

Illustrative embodiments can be configured to perform dual layer deduplication for application specific file types in a manner that improves block level deduplication in the storage system. For example, these embodiments allow data in a file which would otherwise not be deduplicated during typical block level deduplication to be deduplicated, thereby conserving valuable memory resources of the host device or storage system.

These and other embodiments can considerably reduce the amounts of computational and memory resources that are required for storing data, thereby leading to improvements in system performance.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with dual layer deduplication functionality will now be described in greater detail with reference to FIGS. 5 and 6. Although described in the context of system 100, these platforms may also be used to implement at least portions of other information processing systems in other embodiments.

Figure 5:
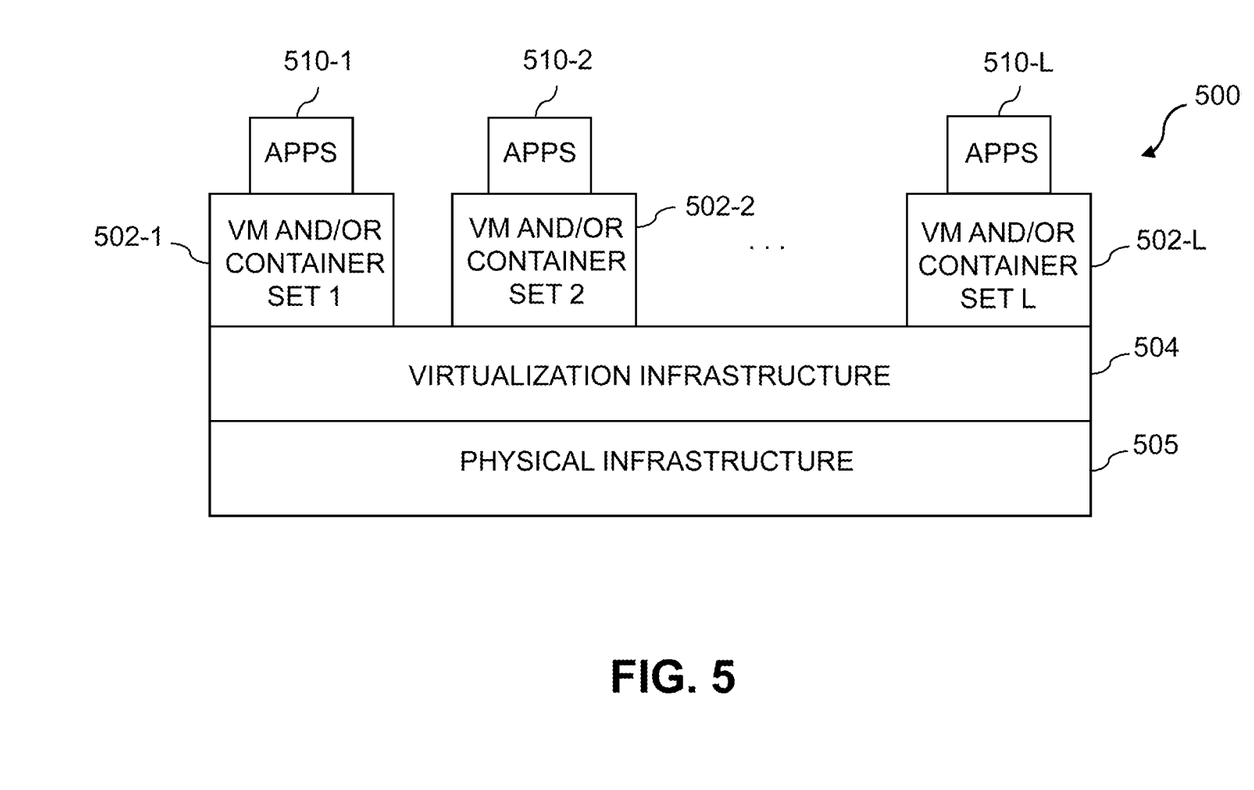
FIGS. 5 and 6 show examples of processing platforms that may be utilized to implement at least a portion of an information processing system in illustrative embodiments.
Figure 6:
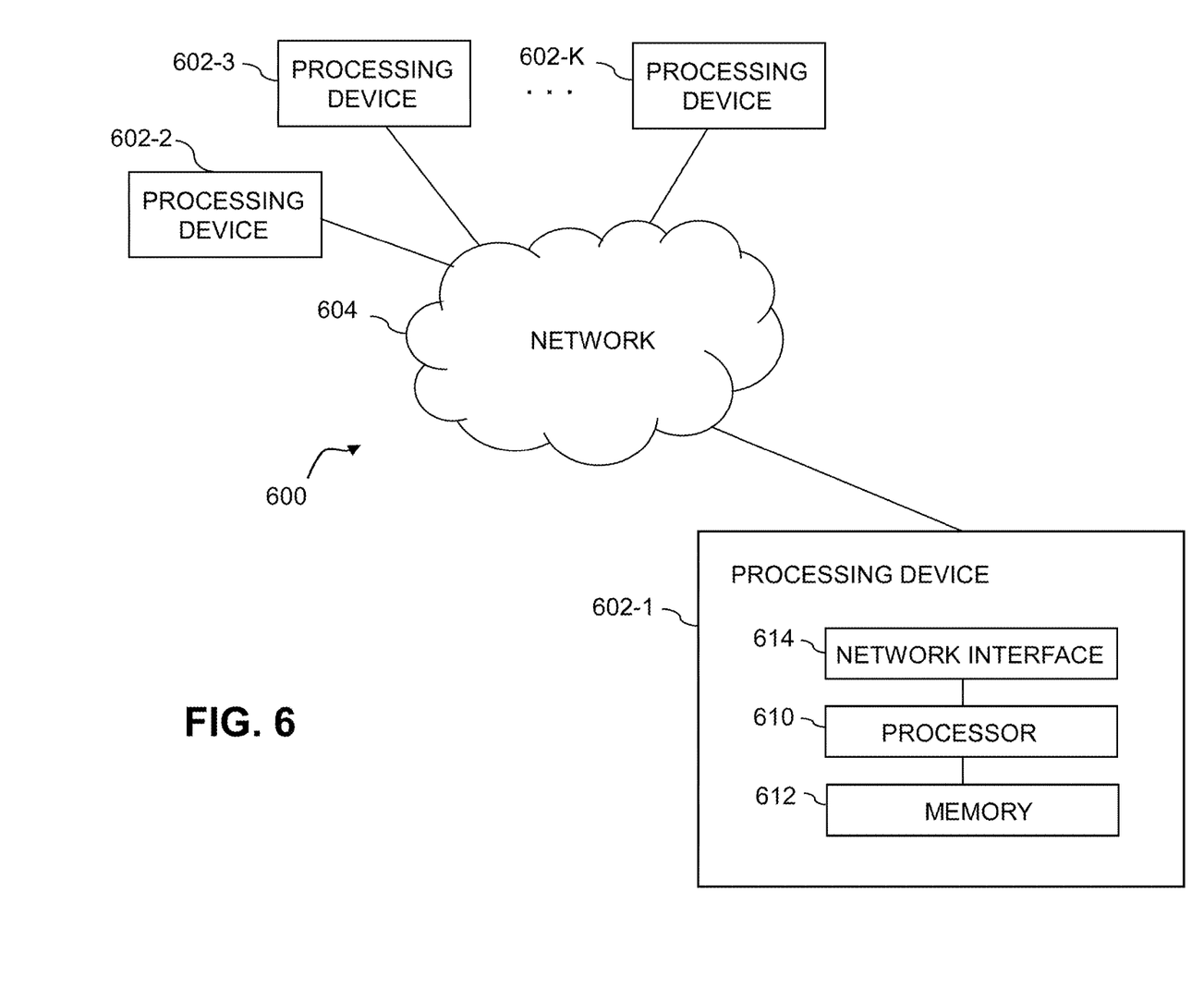

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide dual layer deduplication functionality of the type described above for one or more processes running on a given one of the VMs. For example, each of the VMs can implement deduplication control logic for providing dual layer deduplication functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide dual layer deduplication functionality of the type described above for one or more processes running on different ones of the containers. For example, a container host device supporting multiple containers of one or more container sets can implement one or more instances of deduplication control logic for use in performing dual layer deduplication for application specific file types.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the dual layer deduplication functionality of one or more components of a host device or storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, dual layer deduplication processes and associated control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory, the at least one processing device being configured:
    to obtain a file;
    to determine a type of the file;
    to determine a structure of the file based at least in part on the determined type of the file;
    to identify at least one location in the file based at least in part on the determined structure;
    to divide the file at the identified at least one location into a plurality of chunks; and
    to provide the plurality of chunks to a block deduplication module of a storage system, the block deduplication module configured to perform a deduplication process based at least in part on the plurality of chunks.

2. The apparatus of claim 1, wherein the file comprises data and a metadata file, the metadata file comprising information describing the structure of the data in the file, the at least one processor further configured to add information to the metadata file indicating that the file has been divided at the at least one location.

3. The apparatus of claim 2, wherein the at least one processing device is configured to hide the metadata file.

4. The apparatus of claim 2, wherein the at least one processing device is configured to access the data in the file randomly based at least in part on the metadata file.

5. The apparatus of claim 1, wherein the at least one location is identified such that the plurality of chunks will be bit aligned.

6. The apparatus of claim 1, wherein the at least one processing device is further configured to add trailing zeroes one or more of the plurality of chunks until the one or more of the plurality of chunks have a size that is a multiple of a block size of the storage system.

7. The apparatus of claim 1, wherein:
    determining the type of the file comprises determining that the type is a type that comprises a plurality of sub-files;
    determining the structure of the file based at least in part on the determined type of the file comprises determining the structure of the sub-files within the file;
    identifying the at least one location in the file based at least in part on the determined structure comprises identifying at least one of a start and an end of at least one of the sub-files; and
    dividing the file at the identified at least one location into the plurality of chunks comprises dividing the file at the identified at least one of the start and the end of the at least one of the sub-files.

8. The apparatus of claim 7, wherein:
    determining the structure of the file comprises determining that a first of the sub-files and a second of the sub-files together have a size smaller than a block size of the storage system; and
    dividing the file at the identified at least one location into the plurality of chunks comprises dividing the file such that the first of the sub-files and the second of the sub-files are included in the same chunk.

9. The apparatus of claim 1, wherein the storage system is a content addressable storage system.

10. The apparatus of claim 1, wherein the processing device is implemented in one of:
    a host device configured to communicate over a network with the storage system; and
    the storage system.

11. A method comprising:
    obtaining a file;
    determining a type of the file;
    determining a structure of the file based at least in part on the determined type of the file;
    identifying at least one location in the file based at least in part on the determined structure;
    dividing the file at the identified at least one location into a plurality of chunks; and
    providing the plurality of chunks to a block deduplication module of a storage system, the block deduplication module configured to perform a deduplication process based at least in part on the plurality of chunks,
    wherein the method is implemented by at least one processing device comprising a processor coupled to a memory.

12. The method of claim 11, wherein the file comprises data and a metadata file, the metadata file comprising information describing the structure of the data in the file, the method further comprising adding information to the metadata file indicating that the file has been divided at the at least one location.

13. The method of claim 12, wherein the at least one processor is configured to hide the metadata file.

14. The method of claim 12, wherein the at least one processor is configured to access the data in the file randomly based at least in part on the metadata file.

15. The method of claim 11, wherein the at least one location is identified such that the plurality of chunks will be bit aligned.

16. The method of claim 11, wherein the at least one processor is further configured to add trailing zeroes one or more of the plurality of chunks until the one or more of the plurality of chunks have a size that is a multiple of a block size of the storage system.

17. The method of claim 11, wherein:
determining the type of the file comprises determining that the type is a type that comprises a plurality of sub-files;
determining the structure of the file based at least in part on the determined type of the file comprises determining the structure of the sub-files within the file;
identifying the at least one location in the file based at least in part on the determined structure comprises identifying at least one of a start and an end of at least one of the sub-files; and
dividing the file at the identified at least one location into the plurality of chunks comprises dividing the file at the identified at least one of the start and the end of the at least one of the sub-files.

18. The method of claim 17, wherein:
determining the structure of the file comprises determining that a first of the sub-files and a second of the sub-files together have a size smaller than a block size of the storage system; and
dividing the file at the identified at least one location into the plurality of chunks comprises dividing the file such that the first of the sub-files and the second of the sub-files are included in the same chunk.

19. The method of claim 17, wherein the at least one processing device is implemented in one of:
a host device configured to communicate over a network with the storage system; and
the storage system.

20. A computer program product comprising a non-transitory processor-readable storage medium having stored therein program code of one or more software programs, wherein the program code when executed by at least one processing device causes said at least one processing device:
to obtain a file;
to determine a type of the file;
to determine a structure of the file based at least in part on the determined type of the file;
to identify at least one location in the file based at least in part on the determined structure;
to divide the file at the identified at least one location into a plurality of chunks; and
to provide the plurality of chunks to a block deduplication module of a storage system, the block deduplication module configured to perform a deduplication process based at least in part on the plurality of chunks.

* * * * *